US012588044B2

(12) United States Patent
Seok et al.

(10) Patent No.: US 12,588,044 B2
(45) Date of Patent: Mar. 24, 2026

(54) TRANSMISSION PROTECTION MECHANISM IN 6 GHz

(71) Applicant: MediaTek Singapore Pte. Ltd., Solaris (SG)

(72) Inventors: Yongho Seok, San Jose, CA (US); Jianhan Liu, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 467 days.

(21) Appl. No.: 16/521,136

(22) Filed: Jul. 24, 2019

(65) Prior Publication Data

US 2020/0037342 A1      Jan. 30, 2020

Related U.S. Application Data

(60) Provisional application No. 62/703,955, filed on Jul. 27, 2018, provisional application No. 62/714,158, filed on Aug. 3, 2018.

(51) Int. Cl.
H04W 72/50       (2023.01)
H04W 74/0808       (2024.01)

(52) U.S. Cl.
CPC ..... H04W 72/535 (2023.01); H04W 74/0808 (2013.01)

(58) Field of Classification Search
CPC .............................. H04W 72/00; H04W 74/00
See application file for complete search history.

(56) References Cited

U.S. PATENT DOCUMENTS

2007/0116035 A1* 5/2007 Shao ..................... H04W 74/08
                                                            370/461
2015/0181620 A1* 6/2015 Seok ................. H04W 74/0816
                                                            370/336

(Continued)

FOREIGN PATENT DOCUMENTS

EP             3226641 A1    10/2017
WO        2017217767 A1    12/2017

OTHER PUBLICATIONS

Minyoung Park (Samsung), "Beyond 802.11ax—Throughput Enhancement Utilizing Multi-bands across 2.4/5/6GHz Bands", doc.: IEEE 802.11-18/857r0, May 4, 2018, pp. 1-9.

(Continued)

*Primary Examiner* — Derrick W Ferris

(57) ABSTRACT

System and method of wireless communication that enables determination of a proper channel bandwidth for an HT PPDU without requiring an earlier negotiation process. Assuming a TXOP does not involve any non-HT transmission, in case that TXOP duration information is specified in a first field in a previously transmitted HE PPDU in the same TXOP, the transmission opportunity (TXOP) holder utilizes the channel bandwidth specified in the initial HE PPDU of the same TXOP to determine the channel bandwidth for the subsequent PPDU. In the case that each previously transmitted PPDU has a value indicating duration unspecified in the first field, the TXOP holder determines the channel bandwidth for a subsequent PPDU based on the bandwidth specified in a preceding PPDU that has been transmitted in the same TXOP.

19 Claims, 6 Drawing Sheets

(56) References Cited

U.S. PATENT DOCUMENTS

| | | | | |
|---|---|---|---|---|
| 2015/0236822 A1* | 8/2015 | Pirskanen | .............. | H04L 1/1864 |
| | | | | 370/329 |
| 2016/0113009 A1 | 4/2016 | Seok | | |
| 2016/0174200 A1* | 6/2016 | Seok | ..................... | H04L 5/0092 |
| | | | | 370/329 |
| 2016/0233932 A1 | 8/2016 | Hedayat et al. | | |
| 2016/0323426 A1 | 11/2016 | Hedayat | | |
| 2017/0230973 A1* | 8/2017 | Noh | .................. | H04W 72/0406 |
| 2018/0020448 A1* | 1/2018 | Huang | ................. | H04B 7/0452 |
| 2018/0049194 A1* | 2/2018 | Noh | ....................... | H04W 84/12 |
| 2018/0092127 A1* | 3/2018 | Park | .................. | H04W 72/0453 |
| 2018/0146426 A1* | 5/2018 | Park | .................. | H04W 52/0229 |
| 2019/0090278 A1* | 3/2019 | Chu | ....................... | H04L 5/1461 |
| 2019/0141570 A1* | 5/2019 | Verma | ................... | H04L 5/0007 |
| 2019/0246285 A1* | 8/2019 | Ngai | ....................... | H04L 5/005 |
| 2019/0274140 A1* | 9/2019 | Noh | ....................... | H04W 88/02 |
| 2019/0357256 A1* | 11/2019 | Kim | ....................... | H04W 48/16 |

OTHER PUBLICATIONS

Minyoung Park et al, Beyond 802.11ax—Throughput Enhancement Utilizing Multi-bands across 2.4/5/6 GHZ Bands, May 4, 2018, pp. 1-9, IEEE 802.11-18/857r0, XP068126061.

LAN/MAN Standards Committee of the IEEE Computer Society, IEEE P802.11ax TM/D3.0 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 6: Enhancements for High Efficiency WLAN, IEEE P802.11ax TM/D3.0, Jun. 2018, pp. 1-682, IEEE, New York, USA, XP068137527.

* cited by examiner

TRANSMISSION PROTECTION MECHANISM IN 6 GHz

CROSSREFERENCE TO RELATED APPLICATION

This patent application claims priority and benefit of the U.S. Provisional Patent Application No. 62/703,955, entitled "PROTECTION MECHANISM IN 6 GHz," filed on Jul. 27, 2018, and the U.S. Provisional Patent Application No. 62/714,158, entitled "PROTECTION MECHANISM IN 6 GHz," filed on Aug. 3, 2018. The entire contents of the foregoing patent application are incorporated herein by reference for all purposes.

TECHNICAL FIELD

Embodiments of the present disclosure relate generally to the field of network communication, and more specifically, to the field of communication protocols used in wireless communication.

BACKGROUND OF THE INVENTION

When a transmit station (STA) configures a Physical Layer Convergence Protocol (PLCP) protocol data unit (PPDU), it needs to know the receive STA's available bandwidth as well as its own to set the bandwidth for transmitting the PPDU and thereby protect the transmission opportunity (TXOP). For transmitting a non high throughput (non-HT) or a non-HT duplicate PPDU, dynamic bandwidth configuration can be used, where a negotiation is performed between the transmit and receive ends through Request to Send (RTS)/Clear to Send (CTS) frame exchanges. For example, a transmitter can specify its available bandwidth in a RTS frame and the receiver can respond by specifying its available bandwidth in the CTS frame. Accordingly, the transmitter sets the channel bandwidth parameter (e.g., "CH_BANDWIDTH") of the next PPDU to be transmitted, which is one of the transmission vector parameters (e.g., "TXVECTOR" parameters).

Particularly, an RTS frame may contain a bandwidth signaling target address ("TA") and an indication of dynamic bandwidth for non-HT PPDU, e.g., one of the TXVECTOR parameter: "DYN_BANDWIDTH_IN_NON_HT". For a PPDU to be transmitted, the transmitter holding the TXOP (or TXOP holder) sets the channel bandwidth of the PPDU to be the same as, or narrower than, a channel bandwidth specified in the last received CTS frame in the same TXOP. On the other hand, if the bandwidth configuration is not dynamic, the channel bandwidth of the PPDU is set to be the same as, or narrower than, the channel bandwidth specified in (e.g., "CH_BANDWIDTH") the RTS frame that has been sent by the TXOP holder in the last RTS/CTS exchange in the same TXOP.

If a TXOP is protected by a multi-user (MU)-RTS or CTS frame carried in a non-HT or a non-HT duplicate PPDU, the transmitter can set the CH_BANDWIDTH parameter of the PPDU as follows. If the resource unit (RU) allocation subfields of the MU-RTS trigger frame for all intended receivers are equal to the value (that corresponds to the channel bandwidth) that is indicated in the uplink bandwidth ("UL BW") subfield in the "Common Info" field of the MU-RTS Trigger frame, CH_BANDWIDTH parameter of the PPDU is set to be the same or narrower than the CH_BANDWIDTH value of the MU-RTS trigger frame that has been sent by the transmitter in the last MU-RTS/CTS exchange in the same TXOP. Otherwise, CH_BAND-WIDTH parameter of the PPDU is set to be the same as, or narrower than, the TXVECTOR parameter CH_BAND-WIDTH of the preceding PPDU that it has transmitted in the same TXOP.

If there is no RTS/CTS or MU-RTS/CTS exchange in a TXOP, and the TXOP includes at least one non-HT duplicate frame exchange that does not include a power saving (PS)-Poll, then the TXOP holder sets the CH_BAND-WIDTH parameter of a PPDU to be the same as, or narrower than, the CH_BANDWIDTH value of the initial frame in the first non-HT duplicate frame exchange in the same TXOP, where the PPDU is sent after the first non-HT duplicate frame that is not a PS-Poll.

If there is no non-HT duplicate frame exchange in a TXOP, the TXOP holder sets the CH_BANDWIDTH value of a non-initial PPDU to be the same or narrower than the CH_BANDWIDTH value of the preceding PPDU that it has transmitted in the same TXOP. The setting is subject to two constraints as follows. If the preceding PPDU is a downlink (DL) HE MU PPDU with preamble puncture, the TXOP holder sets the CH_BANDWIDTH of the non-initial PPDU such that its corresponding 20 MHz channels are within a set of 20 MHz channels where pre-HE modulated fields of the preceding PPDU are located. If the non-initial PPDU is a DL HE MU PPDU with preamble puncture, the TXOP holder sets the RU_ALLOCATION parameter (another TXVEC-TOR parameter) of the non-initial PPDU such that its corresponding RU is within a set of 20 MHz channels where pre-HE modulated fields of the preceding PPDU are located.

Next generation WIFI systems are to be developed for 6 GHz band WIFI networks with the assumption that non-HT transmissions are non-typical in such a network. Data transmissions are predominantly conducted among the HE stations (STA), which do not need RTS/CTS exchanges. It is desirable to develop TXOP protection mechanisms for this new WIFI paradigm.

SUMMARY OF THE INVENTION

Accordingly, systems and methods disclosed herein provide effective communication protocols in wireless local area networks to enable effective transmission opportunity (TXOP) protection without relying on Request to Send (RTS)/Clear to Send (CTS) frame exchanges.

Embodiments of the present disclosure include, in case that TXOP duration information is specified in a previously transmitted high efficiency (HE) PPDU in the same TXOP, the transmission opportunity (TXOP) holder utilizing the channel bandwidth specified in the initial HE PPDU of the same TXOP to determine the channel bandwidth for a PPDU to be transmitted. In the case of no TXOP duration has been specified in any previously transmitted PPDU, the TXOP holder determines the channel bandwidth for the PPDU based on the bandwidth specified in a preceding PPDU that has been transmitted in the same TXOP.

If the TXOP holder has transmitted at least one preamble punctured HE MU PPDU with specified TXOP duration information, the channel bandwidth of a subsequent HE PPDU is set such that its corresponding 20 MHz channels are within a set of 20 MHz channels of the initial preamble punctured HE MU PPDU. The pre-HE modulated fields of the initial preamble punctured HE MU PPDU are located in the set of 20 MHz. Further, the RU allocation is set such that the corresponding RU is also located within this set of 20 MHz of the initial preamble punctured HE MU PPDU.

If none of the previously transmitted HE PDU has duration information specified for NAV setting and protection of the TXOP, the channel bandwidth of a subsequent PPDU is set based on a preceding PPDU that is transmitted in the same TXOP, subject to predefined constraints.

Herein, the term "initial PPDU" or "initial preamble punctured PPUD" or alike refer to the first PPDU of the kind following a clear channel assessment (CCA) procedure in the same TXOP. The term "subsequent PPDU" refer to a PPDU yet to be transmitted.

According to embodiments of the present disclosure, a TXOP holder can determine a channel bandwidth for transmitting the next PPDU based on the TXOP protection specification (or lack thereof) in a previously transmitted PPDU in the same TXOP. Thus the medium utilization efficiency can be advantageously increased while the TXOP is protected. Further, since the TXOP holder can determine the channel bandwidth without relying on RTS/CTS exchanges, transmission efficiency and throughput of the WLAN can be significantly enhanced.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
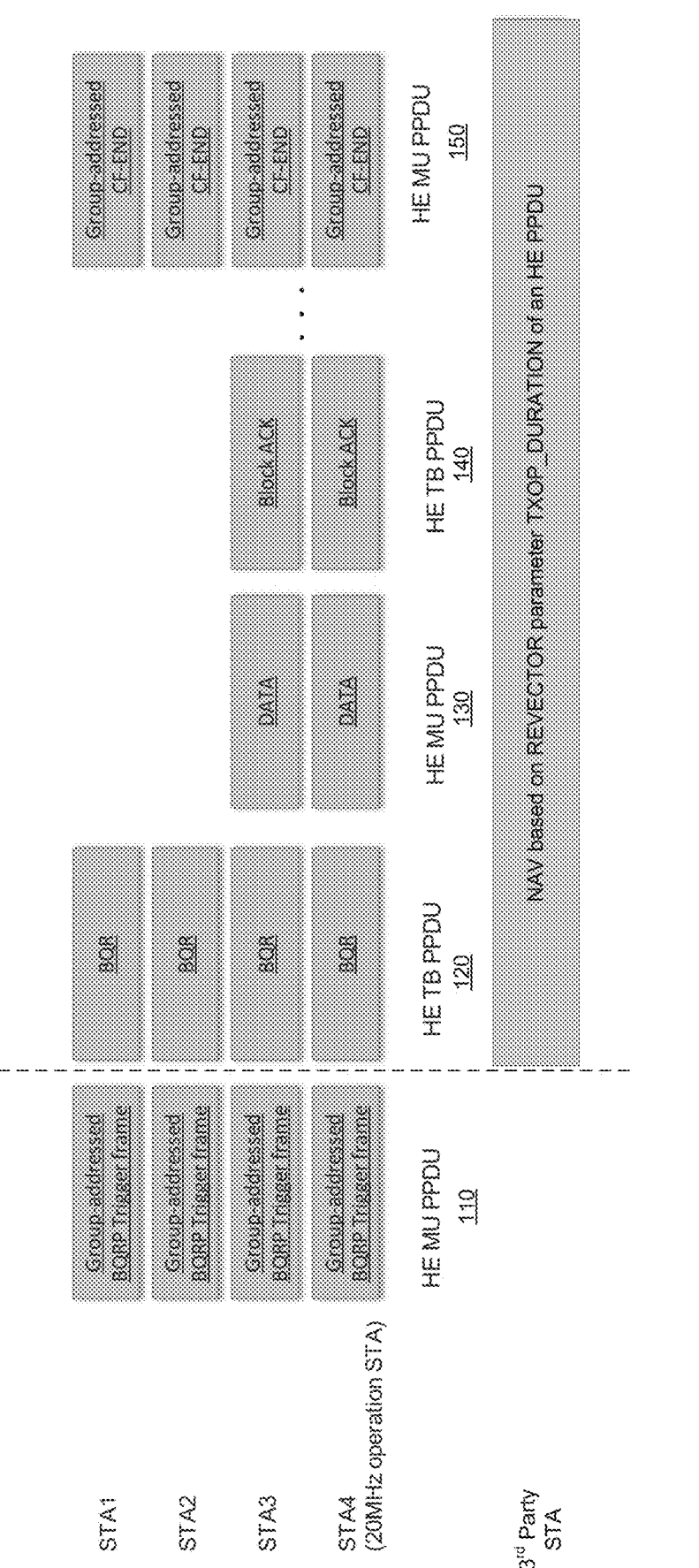
FIG. 1 illustrates the different channel bandwidths of an exemplary sequence of HE PPDUs in a TXOP with the initial PPDU carrying specified TX duration information in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Transmission Protection Mechanism in 6 GHz

Embodiments of the present disclosure are described in detail with reference to the formats and structures of Physical Layer Convergence Protocol (PLCP) protocol data unit (PPDUs), data frames, control frames and management frames as defined in the high efficiency (HE) WLAN-based IEEE 802.11 family of Specifications and Standards. This discussion is exemplary only. The present disclosure is not limited to any specific transmission formats or structures, nor limited to any specific industry standards or specifications.

Embodiments of the present disclosure provide a mechanism of determining a proper channel bandwidth for a PPDU to be transmitted without requiring an earlier negotiation process between the communicating stations (STAs). Assuming a TXOP does not involve any non-HT transmission, in case that TXOP duration information is specified in a previously transmitted high efficiency (HE) PPDU in the same TXOP (e.g., the "TXOP_duration" field specifies a duration value), the transmission opportunity (TXOP) holder utilizes the channel bandwidth specified in the initial HE PPDU of the same TXOP to determine the channel bandwidth for the PPDU to be transmitted. In the case of no TXOP duration being specified in any previously transmitted PPDU (e.g., the "TXOP_duration" field has a value indicating duration unspecified), the TXOP holder determines the channel bandwidth for a subsequent PPDU based on the bandwidth specified in the preceding PPDU that has been transmitted in the same TXOP.

More specifically, the STAs in a WLAN operating on the 6 GHz band are predominantly HE STAs, and the multiple frames in a TXOP can be protected by the transmission opportunity duration (e.g., "TXOP_DURATION") parameter, which is one of the transmission vector (e.g., "TXVECTOR") parameters. According to embodiments of the present disclosure, if there is no non-HT duplicate frame exchange in a TXOP, and if a TXOP holder sends at least one HE PPDU with the TXOP field indicating the TXOP duration information for NAV setting and protection of the TXOP, the TXOP can set the channel bandwidth of the next HE PPDU (a non-initial HE PPDU) to be the same as, or narrower than, the channel bandwidth specified in the initial HE PPDU of such kind in the same TXOP. That is, this initial HE PPDU contains duration information in the TXOP field for NAV timer setting and protection of the TXOP. For example, the TXOP holder can set the CH_BANDWIDTH parameter in the TXVECTOR of the non-initial HE PPDU. The initial HE PPDU also has its channel bandwidth specified in CH_BANDWIDTH parameter in TXVECTOR.

FIG. 1 illustrates the different channel bandwidths of an exemplary sequence of HE PPDUs in a TXOP with the initial PPDU carrying specified TX duration information in accordance with an embodiment of the present disclosure. The sequence includes HE PPDUs of data frames (HE MU PPDU) 110, 130 and 150, and HE PPDUs of control frames (HE trigger-based (TB) PPDUs) 120 and 140. The HE PPDUs are transmitted to the four STAs (STA1~STA4). The HE MU PPDU 110 is the first (initial) HE MU PPDU following the CCA process that has a specified TXOP_DU-RATION value in the TXVECTOR field, the value being used for NAV setting and protection of the TXOP. The first HE MU PPDU 110 may be broadcast from the TXOP holder to all four STAs, and contains group-based Bandwidth Query Report Poll (BQRP) trigger frames. The TXOP holder receives the HE TB PPDU 120 with BQR frames. After transmission of the initial HE MU PPDU 110, a third part STA may set the NAV timer based on one of the RXVEC-TOR parameter, TXOP_DURATION, of the initial HE MU PPDU 110.

The CH_BANDWIDTH parameter of the following HE MU PPDUs 130 and 150 are set to be the same as, or narrower than, the CH_BANDWIDTH value of the initial HE MU PPDU 110. Particularly the channel bandwidth of the HE MU PPDU 130 is smaller than that of the initial HE MU PPDU 110, while the channel bandwidth of the HE MU PPDU 150 is equal to that of the initial HE MU PPDU 110.

Since STA4 is a 20 MHz operating STA and cannot receive 40 MHz, 80 MHz, 160 MHz, or 80+80 MHz HE single user (SU) PPDU, the BQRP Trigger frame directed to STA4 is transmitted in a multi-user manner, e.g., in HE MU PPDU 110. In this way, the group-addressed BQRP Trigger (and group-addressed CF-END) frames sent in an HE MU PPDU 110 can have the same contents.

In some embodiments, if there is no non-HT duplicate frame exchange in a TXOP, and if a TXOP holder sends at least one HE PPDU in the TXOP that has a TXOP field indicating the TXOP duration information, the channel bandwidth of a subsequent HE PPDU is set such that its corresponding 20 MHz channels are within a set of 20 MHz channels of the initial preamble punctured HE MU PPDU. The pre-HE modulated fields of the initial preamble punctured HE MU PPDU are located in the set of 20 MHz. Further, the RU allocation is set such that the corresponding RU is also located within this set of 20 MHz of the initial preamble punctured HE MU PPDU.

On the other hand, if there is no non-HT duplicate frame exchange in a TXOP, and if none of the previously transmitted HE PPDU in the TXOP has specified duration information specified for NAV setting and protection of the TXOP, the TXOP holders sets the channel bandwidth of a subsequent HE PPDU (a non-initial PPDU) to be the same as, or narrower than, that of a preceding HE PPDU (e.g., immediate preceding) that is transmitted in the same TXOP. In some embodiments, two constraints may be imposed for such channel bandwidth setting.

First, if the preceding HE PPDU is a downlink (DL) HE MU PPDU with preamble puncture, the TXOP holder sets the TXVECTOR parameter CH_BANDWIDTH of the non-initial PPDU such that the corresponding 20 MHz channels are within a set of 20 MHz channels where pre-HE modulated fields of the preceding PPDU are located. Second, if the non-initial PPDU is a DL HE MU PPDU with preamble puncture, the TXOP holder sets the RU_ALLOCATION parameter (another TXVECTOR parameter) of the non-initial PPDU such that the corresponding RU is within a set of 20 MHz channels where pre-HE modulated fields of the preceding PPDU are located.

Figure 2:
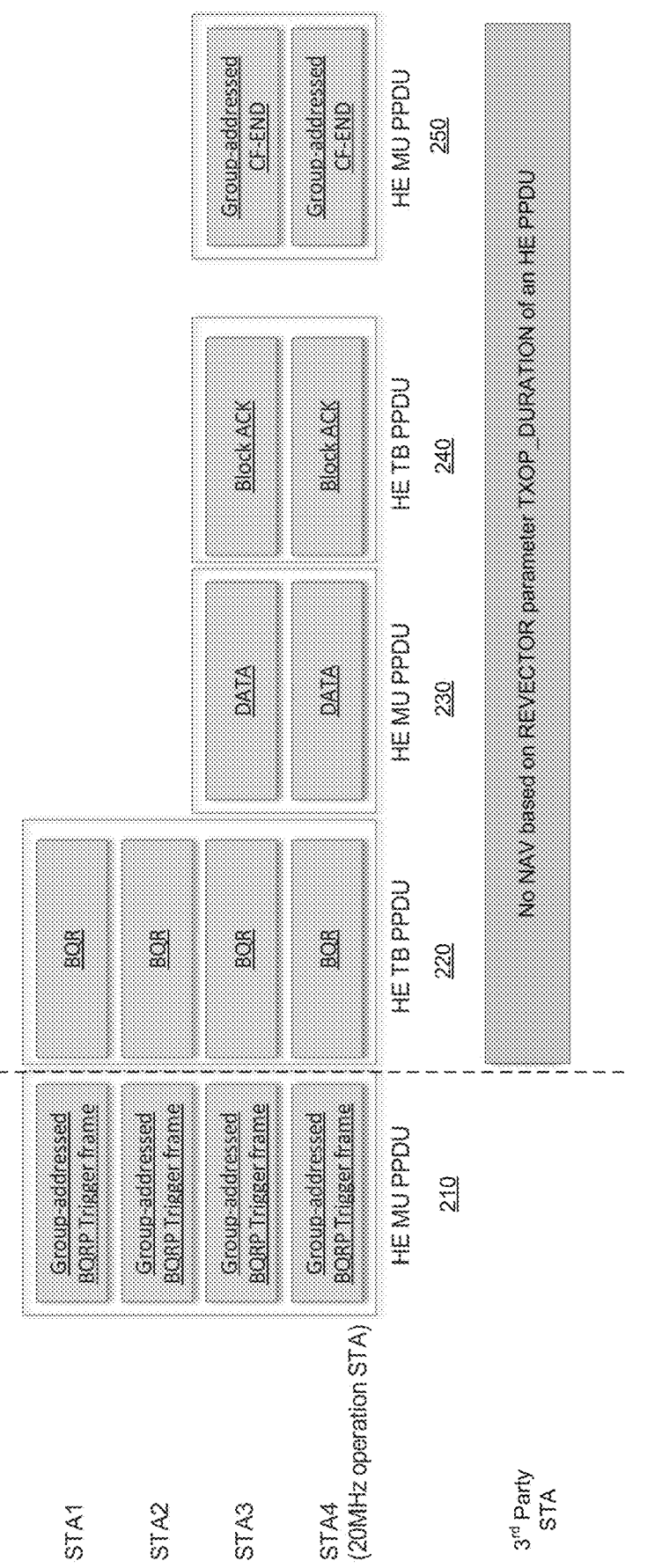
FIG. 2 illustrates the different channel bandwidths of an exemplary sequence of HE PPDUs that are transmitted a TXOP with no PPDU carrying specified TX duration information in accordance with an embodiment of the present disclosure.

FIG. 2 illustrates the different channel bandwidths of an exemplary sequence of HE PPDUs that are transmitted in a TXOP with no transmitted PPDU carrying specified TX duration information in accordance with an embodiment of the present disclosure. Similar with the example illustrated in FIG. 1, the transmission sequence includes HE PPDUs of data frames (HE MU PPDU) 210, 230 and 250, and HE PPDUs of control frames (HE trigger-based (TB) PPDUs) 220 and 240. The HE PPDUs are transmitted to the four STAs (STA1~STA4).

In this example, the TXOP_DURATION parameter in the TXVECTOR field of all the HE PPDUs 210~250 is set to "UNSPECIFIED" which indicates no duration information. Accordingly, the CH_BANDWIDTH parameter in TXVEC-TOR of each non-initial HE MU PPDU is set based on the CH_BANDWIDTH of the immediate preceding HE MU PPDU. For example, the HE MU PPDU 210 is the initial PPDU transmitted after the CCA process. The CH_BAND-WIDTH of the HE MU PPDU 230 is set to be narrower than its preceding HE MU PPDU 210; and the CH_BAND-WIDTH of the HE MU PPDU 250 is set to be the same as its preceding HE MU PPDU 210. After transmission of the initial HE MU PPDU 210, a third party STA does not set the NAV timer based on one of the RXVECTOR parameter, TXOP_DURATION, of an HE PPDU.

Figure 3:
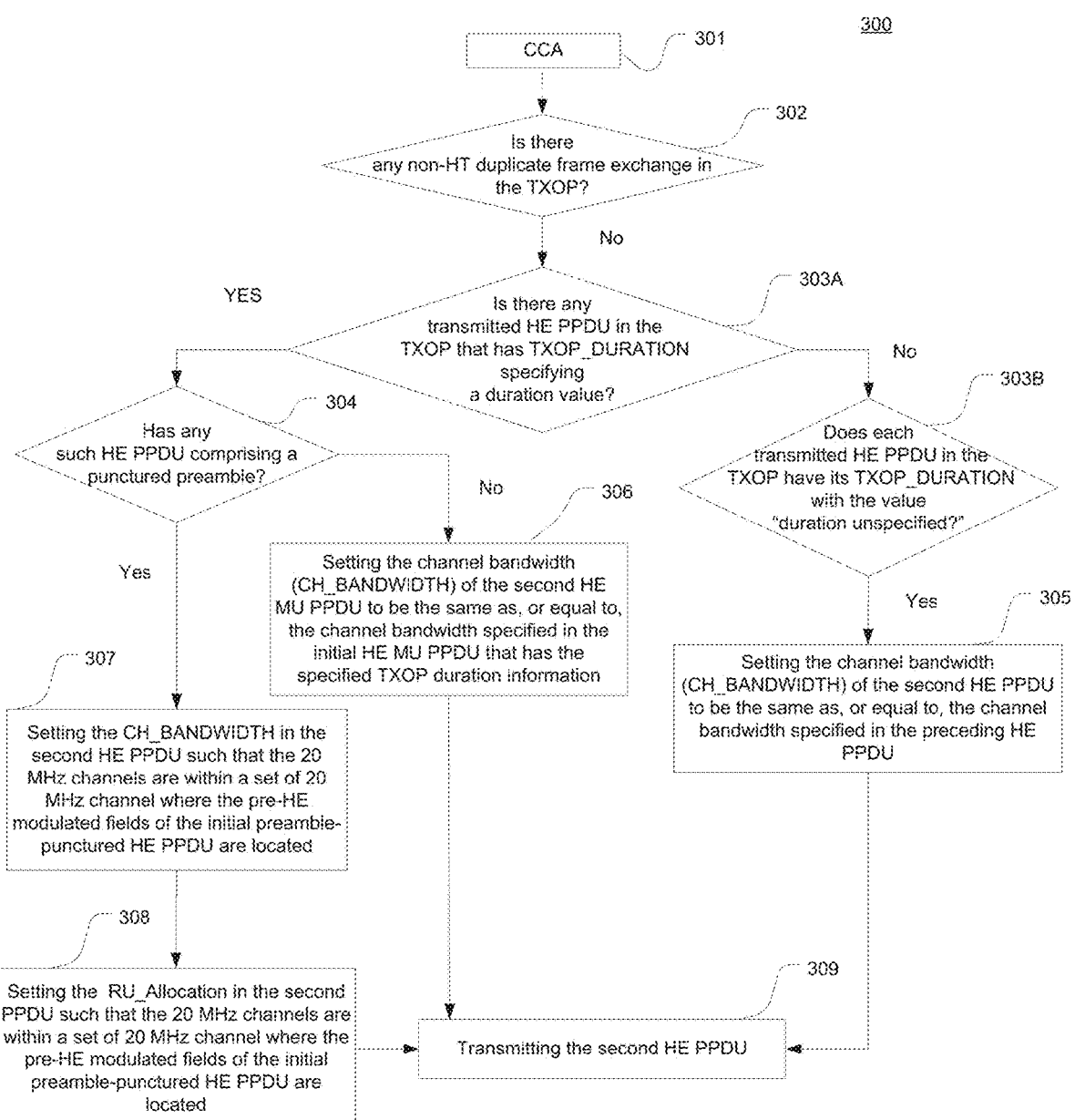
FIG. 3 is a flow chart depicting an exemplary process 300 of setting a channel bandwidth of a PPDU based on the channel bandwidth setting of a prior HE MU PPDU in the same TXOP in accordance with an embodiment of the present disclosure.

FIG. 3 is a flow chart depicting an exemplary process 300 of setting a channel bandwidth of an HE PPDU (referred to as "the second PPDU" in this example) based on the channel bandwidth setting of a previously transmitted HE PPDU in the same TXOP in accordance with an embodiment of the present disclosure. Process 300 may be performed by a transmit STA that has acquired a TXOP. Process 300 may be implemented in software logic, hardware logic or a combination thereof in any suitable manner that is well known in the art.

At 301 a CCA process is performed to ensure that the transmission medium is clear for the TXOP. Following the CCA, at least an initial HE PPDU is generated and transmitted in the TXOP (not explicitly shown). Process 302~309 may be repeated for each non-initial (the second) HE PPDU transmission. Particularly, at 302, it is determined whether there is any non-HT duplicate exchange involved in the TXOP. If no, it is further determined at 303A if there is any transmitted HE PPDU in the TXOP that has a specified TXOP duration value in the "TXOP_duration" field as one element of the transmission vector (TXVECTOR). If no, and if the "TXOP_duration" field has a value indicating "duration unspecified" as determined at 303B, at 305 the TXOP holder sets the channel bandwidth (CH_BANDWIDTH) of the second HE PPDU to be the same as, or narrower than, the channel bandwidth specified in the preceding HE PPDU. The second HE PPDU is then transmitted at 309.

On the other hand, if it is determined at 303A that at least one transmitted HE PPDU has specified TXOP duration information for NAV setting and TXOP protection, it is further determined at 304 whether any such HE PPDU has a punctured preamble. If not, at 306 the TXOP holder sets the channel bandwidth (CH_BANDWIDTH) of the second HE PPDU to be the same as, or narrower than, the channel bandwidth specified in the initial HE PPDU that has the specified TXOP duration information. The second HE PPDU is then transmitted at 309.

If yes (as determined at 304), the TXOP holder sets the CH_BANDWIDTH in the second HE PPDU such that the 20 MHz channels are within a set of 20 MHz channel where the pre-HE modulated fields of the initial preamble-punctured HE PPDU are located. Further, the TXOP holder sets the RU Allocation in the second HE PPDU such that the 20 MHz channels are within a set of 20 MHz channel where the pre-HE modulated fields of the initial preamble-punctured HE PPDU are located. The second HE PPDU is then transmitted at 309.

Generally speaking, in 6 GHz band WLANs, since typically only HE STAs are involved in transmission, the MU-RTS/CTS (normally transmitted in a non-HT duplicate PPDU) can be replaced by the BQRP Trigger frame/BQR carried in an HE SU/MU PPDU and an HE TB PPDU respectively. Reception of the BQRP Trigger frame and transmission of the BQR can be used as a mandatory support in 6 GHz WLAN operations.

When the BQRP Trigger frame/BQR is used to set the NAV, a STA can use information from the BQRP Trigger frame as the most recent basis to update its NAV setting. The STA is permitted to reset its NAV if no PHY-RXSTART.indication primitive is received from the PHY during a NAV time out (NAVTimeout) period. The NAV time out starts when the MAC receives a PHY-RXEND.indication primitive corresponding to the detection of the BQRP Trigger.

In some embodiments, the NAV Time out period is equal to (2×a SIFS Time)+(BQR_Time)+an Rx PHY Start Delay+ (2×a Slot Time). The "BQR_Time" is a transmission time (TXTIME) of an HE TB PPDU carrying the BQR, which is calculated from the Length subfield in the Common Info field of the BQRP Trigger frame.

In an HE BSS, the use of RTS/CTS can be TXOP duration-based or PSDU length-based. An HE access point (AP) can configure to use the TXOP duration-based RTS/CTS exchanges to mitigate interference in dense environments. An HE AP may set the TXOP Duration RTS Threshold subfield of HE Operation element it transmits to a value less than 1023, thereby enabling TXOP duration-based RTS/CTS exchanges of its associated STAs. The AP may set the TXOP Duration RTS Threshold field to 1023 to disable TXOP duration-based RTS/CTS exchanges of its associated STAs.

According to embodiments of the present disclosure, the mandatory protection mechanism in 6 GHz can be the TXVECTOR parameter TXOP_DURATION of an HE PPDU. Thus, in 6 GHz band WLANs, instead of the controlling the RTS/CTS, an AP can configure whether the STA shall set the TXVECTOR parameter TXOP_DURATION of an HE PPDU to the duration information for NAV setting and protection of the TXOP.

To set the NAV, an HE AP may set the TXOP Duration Threshold subfield of HE Operation element it transmits to a value less than 1023 to enable TXOP duration-based TXOP_DURATION parameter exchanges of its associated STAs. The non-AP HE STA sets dot11TXOPDurationThreshold to the value of the TXOP Duration Threshold subfield. The AP may set the TXOP Duration Threshold field to 1023 to disable TXOP duration-based TXOP_DURATION parameter exchanges of its associated STAs. A non-AP HE STA sets the TXVECTOR parameter TXOP_DURATION of an HE PPDU to the duration information for NAV setting and protection of the TXOP to initiate a TXOP, if TXOP duration-based TXOP_DURATION parameter exchange is enabled at a non-AP HE STA and the following conditions are met: (1) the STA intends to transmit individually addressed frames to the HE AP or to a TDLS peer STA; and (2) the TXOP duration is greater than or equal to 32 μs×dot11TXOPDurationThreshold.

A TXOP holder that transmits a PPDU using one of the modulation classes can transmit a short control frame as the final transmission in a TXOP, under the specified conditions. The final transmission can be a CF-End, or a CTS-to-self when no NAV needs to be truncated. The final transmission at the lowest data rate within the modulation class is needed because a final transmission at a higher rate can cause spurious EIFSs to occur, because the PHY header of such frames travels farther than the MPDU.

According to embodiments of the present disclosure, in 6 GHz band WLANs, to avoid the spurious EIFS, the TXOP holder does not set the TXVECTOR parameter TXOP_DURATION of the final PPDU to UNSPECIFIED (indicating no duration value), because the EIFS is not invoked if the RXVECTOR parameter TXOP_DURATION of a received HE PPDU is not set to UNSPECIFIED.

When the BSS Color Disabled field is set to "1" in the HE Operation element most recently received/transmitted from an AP, the HE AP sets the TXVECTOR parameter TXOP_DURATION to UNSPECIFIED for an HE PPDU that it transmits to non-AP STAs associated to it, except when the TXOP_DURATION parameter is equal to 0. This is because the TXOP_DURATION parameter being equal to 0 does not cause any NAV update. But, it can still help avoid the spurious EIFS.

According to embodiments of the present disclosure, in 6 GHz operations, a TXOP holder that has sent at least one HE PPDU can send any CF-End frame using an HE PPDU, where the sent HE PPDU has a TXOP field indicating duration information for NAV setting and protection of the TXOP.

According to embodiments of the present disclosure, in 6 GHz operations, 20 MHz operating STA cannot receive a CF-END frame when the CF-END frame is transmitted in 40 MHz, 80 MHz, 160 MHz, or 80+80 MHz HE PPDU. A 20 MHz operating STA cannot receive a Trigger frame when the Trigger frame is transmitted in 40 MHz, 80 MHz, 160 MHz, or 80+80 MHz HE PPDU. In some embodiments, one or more group-addressed frames can be transmitted in an HE MU PPDU. In such case, the same group-addressed frames are transmitted in one or more broadcast RU. The modulation and coding scheme (MCS) of the group-addressed frames transmitted on different RUs can be different.

Figure 4:
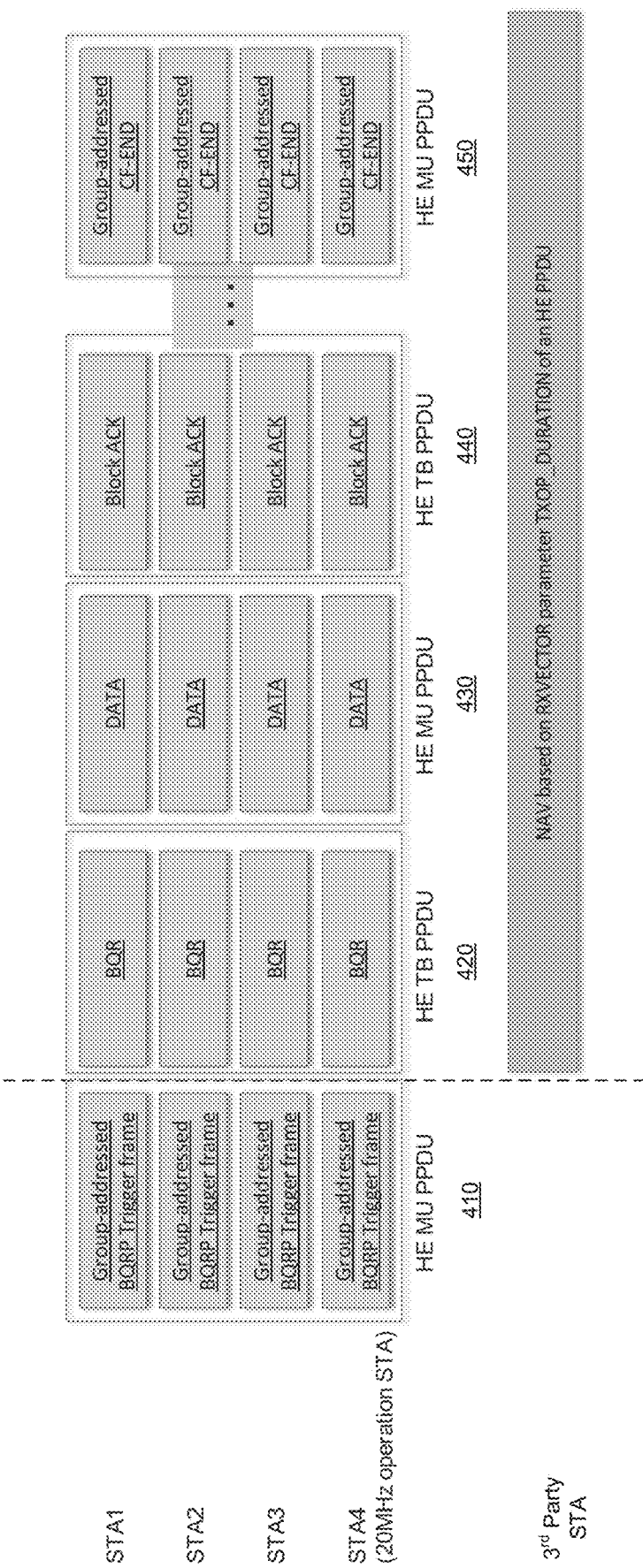
FIG. 4 illustrates an exemplary sequence of frame exchanges 410~450 in a TXOP that involves a 20 MHz operating STA in accordance with an embodiment of the present disclosure.

FIG. 4 illustrates an exemplary sequence of frame exchanges 410~450 in a TXOP that involves a 20 MHz operating STA in accordance with an embodiment of the present disclosure. Since STA4 that is a 20 MHz operating STA can't receive 40 MHz, 80 MHz, 160 MHz, or 80+80 MHz HE PPDU HE SU PPDU, the BQRP Trigger frame are transmitted in an HE MU PPDU. In addition, the group-addressed BQRP Trigger (and group-addressed CF-END) frames 410 sent in an HE MU PPDU have the same contents. One of the frames is directed to STA4 (20 MHz operating STA).

Figure 5:
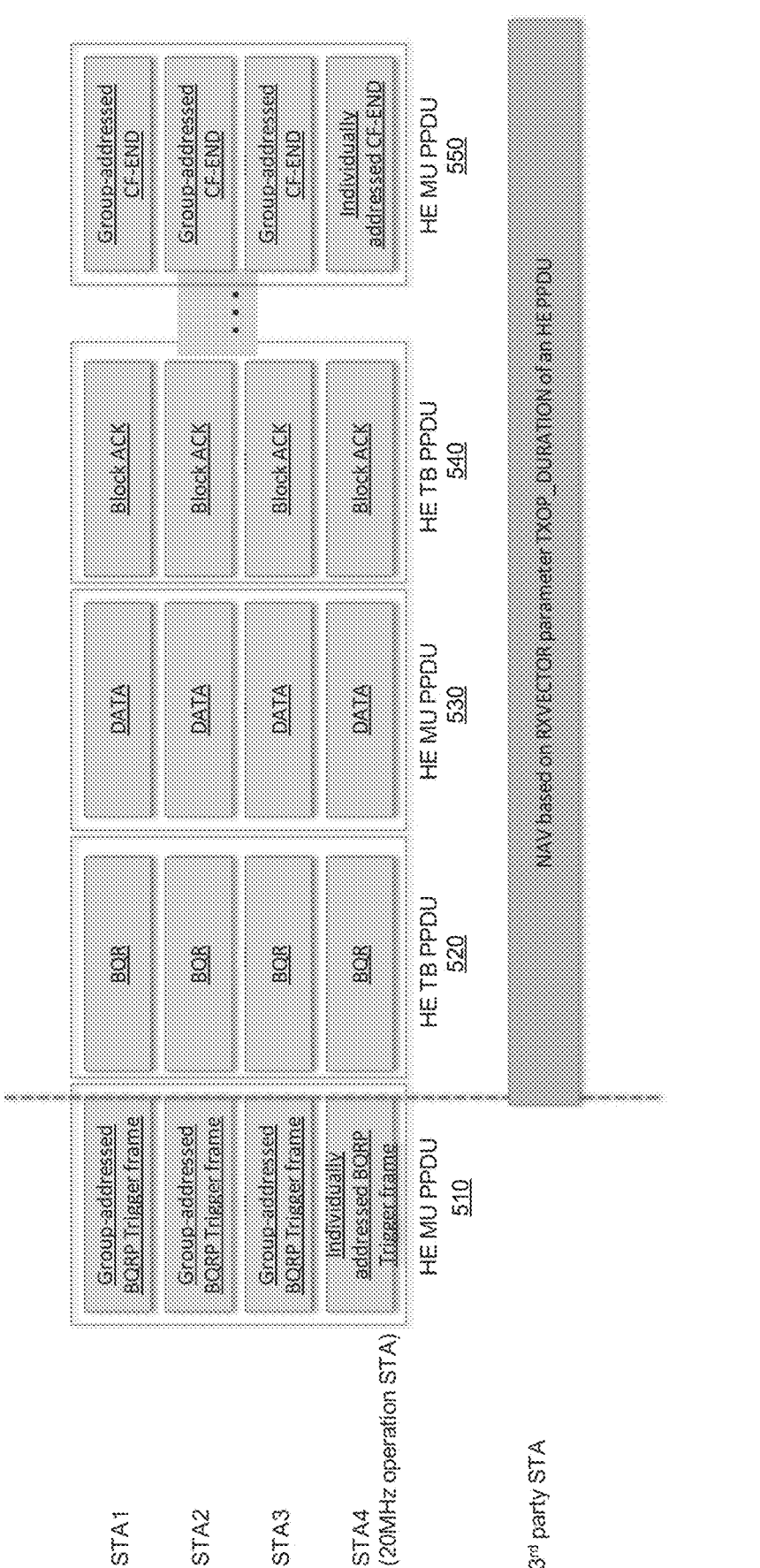
FIG. 5 illustrates another exemplary sequence of frame exchanges 510~550 in a TXOP that involves a 20 MHz operating STA in accordance with an embodiment of the present disclosure.

FIG. 5 illustrates another exemplary sequence of frame exchanges 510~550 in a TXOP that involves a 20 MHz operating STA in accordance with an embodiment of the present disclosure. Since STA4 is a 20 MHz operating STA and can't receive 40 MHz, 80 MHz, 160 MHz, or 80+80 MHz HE PPDU HE SU PPDU, the BQRP Trigger frame is transmitted in an HE MU PPDU. Alternatively, the individually addressed BQRP Trigger (and individually addressed CF-END) frames sent in an HE MU PPDU is used for STA4 (20 MHz operating STA).

Figure 6:
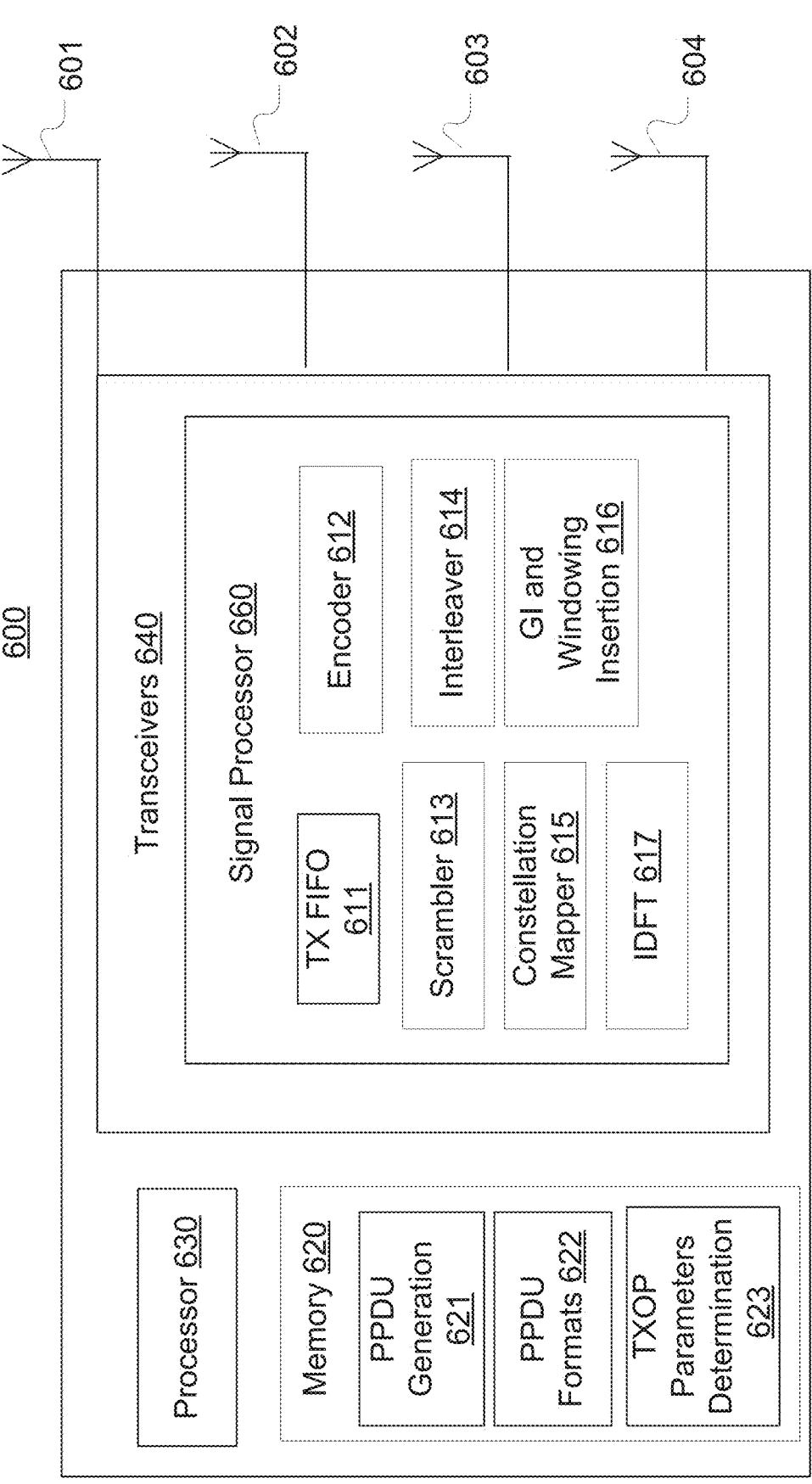
FIG. 6 is a block diagram of an exemplary wireless communication device capable of determining a channel bandwidth for an HE PPDU without requiring an earlier negotiation process in accordance with an embodiment of the present disclosure.

FIG. 6 is a block diagram of an exemplary wireless communication device capable of determining a channel bandwidth for an HE PPDU without requiring a prior negotiation process in accordance with an embodiment of the present disclosure. The communication device 600 may be configured as an AP and may be an STA device having a transceiver configured for data communication and WLAN management, e.g., a router, a general purpose computer, a smart phone, a portable electronic device, a tablet wearable device, a sensor used on Internet of Things (IoT), and etc.

The device 600 includes a main processor 630, a memory 620 and a transceiver 640 coupled to an array of antenna 601-604. The memory 620 stores the PPDU generation module 621 and PPDU format module 622 in compliance with one or more communication protocols and standards. The PPDU format module 622 stores the formats and field definitions of various types of frames that can be transmitted from or received by the device 600. In addition, the memory 620 stores processor-executable instructions that implement a TXOP parameter determination module 623. As described in greater detail with reference to FIG. 1~3, the TXOP parameter determination module 623 can utilize the channel bandwidth specified in the initial HE PPDU of a same TXOP to determine the channel bandwidth for a non-initial PPDU. In the case of no TXOP duration has been specified in any previously transmitted PPDU, the TXOP holder determines the channel bandwidth for a subsequent PPDU based on the bandwidth specified in a preceding PPDU that has been transmitted in the same TXOP.

The transceiver 640 includes a signal processor 660 having various modules of the transmit path which is configured to generate beacon frames, association response frames, data frames or any other type of communication transmission units. For instance, the signal processor 660 includes a transmit First-In-First-Out (TX FIFO) 611, an encoder 612, a scrambler 613, an interleaver 614, a constellation mapper 615, an inversed discrete Fourier transformer (IDFT) 617, and a guard interval (GI) and windowing insertion module 616. The signal processor 650 also includes a receive path, detailed illustration and description of which are omitted for brevity.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication through a wireless local area network (WLAN), the method comprising:
   at a transmitter, acquiring a first transmission opportunity (TXOP);
   after a clear channel assessment (CCA) process, setting a first field in an initial high efficiency (HE) Physical Layer Convergence Protocol (PLCP) protocol data unit (PPDU) to specify a first duration value for Network Allocation Vector (NAV) setting and protection of said first TXOP, wherein said first TXOP is free of any Request to Send (RTS)/Clear to Send (CTS) exchange, and wherein said first field comprises at least one of: a plurality of duration values comprising said first duration value; and said first duration value indicating duration unspecified;
   setting a second field in said initial HE PPDU to specify a first channel bandwidth of said initial HE PPDU;
   transmitting said initial HE PPDU;
   determining that said first TXOP is free of transmission of any non-high throughput (non-HT) PPDU;
   after said initial HE PPDU is transmitted and responsive to said determining, setting said second field in a second HE PPDU to specify a second channel bandwidth of said second HE PPDU, wherein said second channel bandwidth is equal to or narrower than said first channel bandwidth; and
   transmitting said second HE PPDU in said first TXOP using said second channel bandwidth, wherein said second HE PPDU comprises multiple frames.

2. The method of claim 1, further comprising
   acquiring a second TXOP;
   after a CCA process, setting said first field in an initial HE preamble-punctured PPDU to indicate a second duration value for NAV setting and protection of said second TXOP, wherein pre-HE modulated fields of said initial HE preamble-punctured PPDU are located in a first set of 20 MHz channels;
   transmitting said initial HE preamble-punctured PPDU;
   after said initial HE preamble-punctured PPDU is transmitted and responsive to a determination that said second TXOP is free of any non-HT PPDU transmission, setting said second field in a second HE preamble-punctured PPDU to indicate a third channel bandwidth having a second set of 20 MHz channels encompassed by said first set of 20 MHz channels; and
   transmitting said second HE preamble-punctured PPDU in said second TXOP.

3. The method of claim 2, further comprising allocating resource units (RUs) for said second HE preamble-punctured PPDU, wherein said RUs are located within said first set of 20 MHz channels of said initial HE preamble-punctured PPDU.

4. The method of claim 1, further comprising
   acquiring a third TXOP;
   after a CCA process and responsive to determination that:
      said third TXOP is free of any non-HT PPDU transmission; and
      each HE PPDU that has been transmitted in said third TXOP indicates in said first field duration unspecified for NAV setting and protection of said third TXOP, setting said second field in a third HE PPDU to indicate a fourth channel bandwidth of said third HE PPDU, wherein said fourth channel bandwidth is equal to or narrower than a channel bandwidth of a preceding HE PPDU that has been transmitted in said third TXOP; and
   transmitting said third HE PPDU in said third TXOP using said fourth channel bandwidth.

5. The method of claim 4, wherein said preceding HE PPDU is a downlink HE multi-user (MU) PPDU with preamble puncture, wherein pre-HE modulated fields of said preceding HE preamble-punctured PPDU are located in a third set of 20 MHz channels, and wherein further said third channel bandwidth comprises a fourth set of 20 MHz channels that is encompassed in said third set of 20 MHz channels.

6. The method of claim 4, wherein said third HE PPDU is a downlink (DL) HE MU PPDU with preamble puncture, wherein pre-HE modulated fields of said preceding HE preamble-punctured PPDU are located in a fifth set of 20 MHz channels, and further comprising allocating an RU for said third HE preamble-punctured PPDU to be encompassed in said fifth set of 20 MHz channels.

7. The method of claim 1, wherein said WLAN is a 6 GHz WIFI network.

8. A method of wireless communication through a WIFI LAN, comprising, acquiring a first transmission opportunity (TXOP);

after a clear channel assessment (CCA) process and responsive to a determination that:

said first TXOP is free of any non-high throughput (non-HT) Physical Layer Convergence Protocol (PLCP) protocol data unit (PPDU) transmission, wherein said first TXOP is free of any Request to Send (RTS)/Clear to Send (CTS) exchange; and PPDUs transmitted in said first TXOP have a value indicating duration unspecified for network allocation vector (NAV) setting and protection of said first TXOP in a first field of the PPDUs transmitted in said first TXOP, wherein said first field comprises at least one of: a plurality of duration values; and a value indicating duration unspecified;

setting a second field in a non-initial high efficiency (HE) PPDU to indicate a first channel bandwidth of said non-initial HE PPDU, wherein said first channel bandwidth is equal to or narrower than a channel bandwidth of a preceding HE PPDU that has been transmitted in said first TXOP; and transmitting said non-initial HE PPDU in said first TXOP using said first channel bandwidth.

9. The method of claim 8, wherein said preceding HE PPDU is a downlink HE multi-user (MU) PPDU with preamble puncture, wherein pre-HE modulated fields of said preceding HE preamble-punctured PPDU are located in a first set of 20 MHz channels, and wherein further said first channel bandwidth comprises a second set of 20 MHz channels that is encompassed in said first set of 20 MHz channels.

10. The method of claim 8, wherein said non-initial HE PPDU is a downlink (DL) HE multi-user (MU) PPDU with preamble puncture, wherein pre-HE modulated fields of said preceding HE preamble-punctured PPDU are located in a third set of 20 MHz channels, and further comprising allocating a resource unit (RU) for said non-initial HE PPDU to be encompassed in said third set of 20 MHz channels.

11. The method of claim 8, further comprising:

acquiring a second TXOP;

after a clear channel assessment (CCA) process, setting said first field in an initial HE PPDU to specify a first duration value for Network Allocation Vector (NAV) setting and protection of said second TXOP;

setting said second field in said initial HE PPDU to specify a second channel bandwidth of said initial HE PPDU;

transmitting said initial HE PPDU;

after said initial HE PPDU is transmitted and responsive to a determination that said first TXOP is free of any transmission of any non-HT PPDU, setting said second field in a second PPDU to specify a third channel bandwidth of said second HE PPDU, wherein third channel bandwidth is equal to or narrower than said second channel bandwidth; and transmitting said second HE PPDU in said first TXOP using said third channel bandwidth, wherein said second HE PPDU comprises multiple frames.

12. The method of claim 8, further comprising acquiring a third TXOP;

after a CCA process, setting said first field in an initial HE preamble-punctured PPDU to indicate a second duration value for NAV setting and protection of said third TXOP, wherein pre-HE modulated fields of said initial HE preamble-punctured PPDU are located in a fifth set of 20 MHz channels;

transmitting said initial preamble-punctured HE PPDU;

after said initial HE preamble-punctured PPDU is transmitted and responsive to a determination that said third TXOP is free of any non-HT PPDU transmission, setting said second field in a second HE preamble-punctured PPDU to indicate a third channel bandwidth having a sixth set of 20 MHz channels encompassed by said fifth set of 20 MHz channels; and transmitting said second HE preamble-punctured PPDU in said third TXOP.

13. The method of claim 12, further comprising allocating resource units (RUs) for said second HE preamble-punctured PPDU, wherein an RU is located within said fifth set of 20 MHz channels of said initial HE preamble-punctured PPDU.

14. A wireless communication device comprising:

a memory;

a processor coupled to the memory, wherein said memory comprises instructions that, when executed, cause said wireless communication device to perform a method comprising:

acquiring a first transmission opportunity (TXOP), wherein said first TXOP is free of any Request to Send (RTS)/Clear to Send (CTS) exchange;

after a clear channel assessment (CCA) process, setting a first field in an initial high efficiency (HE) Physical Layer Convergence Protocol (PLCP) protocol data unit (PPDU) to specify a first duration value for Network Allocation Vector (NAV) setting and protection of said first TXOP, wherein said first field is defined to specify one of: a plurality of duration values comprising said first duration value; and a value indicating duration unspecified;

setting a second field in said initial HE PPDU to specify a first channel bandwidth of said initial HE PPDU;

transmitting said initial HE PPDU;

determining that said first TXOP is free of transmission of any non-high throughput (non-HT) PPDU;

after said initial HE PPDU is transmitted and responsive to the determining, setting said second field in a second HE PPDU to specify a second channel bandwidth of said second HE PPDU, wherein said second channel bandwidth is equal to or narrower than said first channel bandwidth; and transmitting said second HE PPDU in said first TXOP using said second channel bandwidth, wherein said second HE PPDU comprises multiple frames.

15. The wireless communication device of claim 14, wherein said method further comprises:

acquiring a second TXOP;

after a CCA process, setting said first field in an initial HE preamble-punctured PPDU to indicate a second duration value for NAV setting and protection of said second TXOP, wherein pre-HE modulated fields of said initial HE preamble-punctured PPDU are located in a first set of 20 MHz channels;

transmitting said initial preamble-punctured HE PPDU;

after said initial HE preamble-punctured PPDU is transmitted and responsive to a determination that said second TXOP is free of any non-HT PPDU transmission, setting said second field in a second HE preamble-punctured PPDU to indicate a third channel bandwidth having a second set of 20 MHz channels encompassed by said first set of 20 MHz channels; and transmitting said second HE preamble-punctured PPDU in said second TXOP.

16. The wireless communication device of claim 15, wherein said method further comprises allocating resource units (RUs) for said second HE preamble-punctured PPDU, wherein said RUs are located within said first set of 20 MHz channels of said initial HE preamble-punctured PPDU.

17. The wireless communication device of claim 15, wherein said method further comprises:

acquiring a third TXOP;

after a CCA process and responsive to determination that:

said third TXOP is free of any non-HT PPDU transmission; and each PPDU that has been transmitted in said third TXOP has in said first field said value indicating duration unspecified for NAV setting and protection of said third TXOP;

setting said second field in a third HE PPDU to indicate a fourth channel bandwidth of said third PPDU, wherein said fourth channel bandwidth is equal to or narrower than a channel bandwidth of a preceding HE PPDU that has been transmitted in said third TXOP; and transmitting said third HE PPDU in said third TXOP using said fourth channel bandwidth.

18. The wireless communication device of claim 17, wherein said preceding HE PPDU is a downlink HE multi-user (MU) PPDU with preamble puncture, wherein pre-HE modulated fields of said preceding HE preamble-punctured PPDU are located in a third set of 20 MHz channels, and wherein further said third channel bandwidth comprises a fourth set of 20 MHz channels that is encompassed in said third set of 20 MHz channels.

19. The wireless communication device of claim 17, wherein said third HE PPDU is a downlink HE MU PPDU with preamble puncture, wherein pre-HE modulated fields of said preceding HE preamble-punctured PPDU are located in a fifth set of 20 MHz channels, and further comprising allocating an RU for said third HE PPDU to be encompassed in said fifth set of 20 MHz channels.

* * * * *